(No Model.)
L. A. DAVIS.
CORN HARVESTER.
No. 410,500. Patented Sept. 3, 1889.
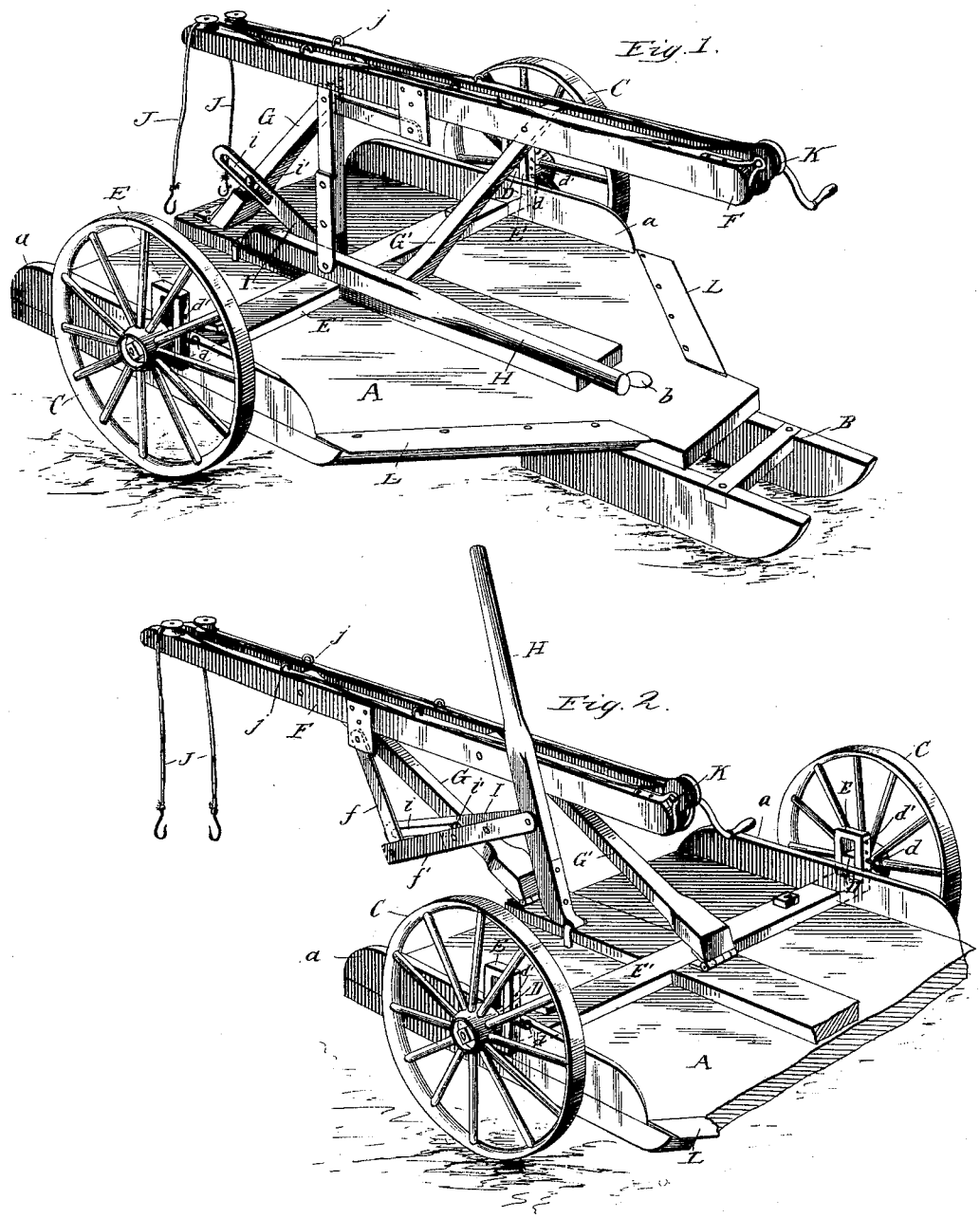
WITNESSES
C. H. Raeder
Van Buren Hillyard
INVENTOR
Lewis A. Davis
By R. S. & A. P. Lacey
Attorneys

UNITED STATES PATENT OFFICE.

LEWIS A. DAVIS, OF DELAWARE, OHIO, ASSIGNOR TO THE DELAWARE CORN HARVESTER COMPANY, OF SAME PLACE.

CORN-HARVESTER.

SPECIFICATION forming part of Letters Patent No. 410,500, dated September 3, 1889.

Application filed December 28, 1888. Serial No. 294,878. (No model.)

*To all whom it may concern:*

Be it known that I, LEWIS A. DAVIS, a citizen of the United States, residing at Delaware, in the county of Delaware and State of Ohio, have invented certain new and useful Improvements in Corn-Harvesters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to corn-harvesting machines in which the grain is cut and received on the platform by one or more persons, who arrange it in sheaves and bind it to a swinging jib, by means of which it (the sheaf or sheaves) is deposited on the ground.

The invention is particularly designed as an improvement on the machine for which I made application for Letters Patent on or about the 6th day of October, 1888, Serial No. 287,366.

The improvement consists in the means for operating the swinging jib and in the peculiar construction and the arrangement of the parts, which will be hereinafter more fully described and claimed, and shown in the drawings, in which—

Figure 1 is a perspective view of a machine embodying my invention; and Fig. 2, a perspective view, parts being broken away, showing the position of the jib when operating to discharge the load.

The platform A, having side pieces *a*, is supported on the wheels C C at the rear and the runners B at the front, the runners being connected together to form a sled which is pivotally connected with the platform at *b*. The wheels C are vertically adjustable with reference to the platform to adapt the machine to cut the grain at a greater or less distance from the ground, being mounted on spindles which are carried by the blocks D, vertically adjustable in the slotted standards E and held therein by the pins *d*, which pass through the series of openings *d'*. The standards E are formed by bending the ends of the axle E' vertically, substantially as shown. The swinging jib F is pivotally supported on the bars G and G', which are also hinged at their lower ends directly to the platform. The operating-lever H, pivoted at its inner end to the platform, is connected with the jib F by the toggle-levers *f* and *f'*, and with the bar G by the rod I, which is slotted at its outer end at *i* to receive the pin *i'*, projecting from the side of the bar G. The binding-cords J J pass over pulleys on the end of the jib and are adapted to be wound on the windlass K, which draws them tight about the sheaf or sheaves.

The sled B causes the machine to run steadily, and serves as a brake when the machine is going downhill.

The operation of the machine is as follows: When it is drawn over the field, the grain is cut by the knives L L, which are arranged on opposite sides of the center of the machine and obliquely to its draft, and is received by one or more persons on the platform, who arrange it in one or more sheaves and bind it to the jib. When a sufficient quantity of grain is cut to form a sheaf, it is bound to the jib by passing the cord J—if two sheaves both cords—around it, and catching the end of the cord in one of the staples *j* on the jib and drawing the said cord taut by operating the windlass. The sheaf being bound to the jib is discharged by operating the lever H, which swings the jib to the rear of the machine, as shown most clearly in Fig. 2.

In Fig. 1 is shown the normal position of the swinging jib F, it being supported on the end of the toggle-lever *f'*, which is adapted to come beneath it. The bundles are placed upon either or both sides of the jib and are secured thereto by passing the cords J around the said bundles and engaging the hooked ends of the cords in the staples *j*. To discharge the load, the lever H is lifted, carrying with it the lever *f'* and the beam F, resting on said lever *f'*. When the bars G and G' assume a vertical position, the inner end of the slot *i* in the rod I engages with the pin *i'* and carries said bars past the perpendicular, the load completing the rearward movement of the beam. The jib is returned to its normal position by turning the lever H down on the platform. This movement brings the outer end of the said slot *i* in engagement with the pin *i'*, which effects the returning or resetting of the said jib.

Having thus described my invention, what I claim, and desire to secure by Letters Patent, is—

1. The combination, with the platform and the swinging jib, of the pivoted levers, the operating-lever, and the toggle-levers connecting the operating-lever with the said jib, substantially as described.

2. The combination, with the platform, the swinging jib, and the bars G and G', of the operating-lever connected with the jib, and the rod I, connecting the said lever with one of the said bars, substantially as shown.

3. The combination of the platform, the swinging jib, the bars connecting the jib with the platform, the operating-lever, the toggle-levers connecting the operating-lever with the said jib, the slotted rod connected with the operating-lever, and the pin projecting from one of the bars and working in the slot of the said rod, substantially as set forth.

4. The herein-described corn-harvester, composed of the platform having knives on its front end arranged obliquely to the line of draft of the machine, the runners, the vertically-adjustable wheels, the swinging jib, the operating-lever, the toggle-levers connecting the jib with the said lever, the slotted rod connected with the lever, and the pin projecting from one of the jib-supports and working in the slot of said bar, substantially as described.

In testimony whereof I affix my signature in presence of two witnesses.

LEWIS A. DAVIS.

Witnesses:
W. R. CARPENTER,
W. A. HALL.